United States Patent [19]

Ugelstad

[11] 4,186,120

[45] Jan. 29, 1980

[54] PROCESS FOR PRODUCING FINELY DIVIDED AQUEOUS EMULSIONS FROM MATERIALS OF LIMITED WATER SOLUBILITY

[75] Inventor: John Ugelstad, Trondheim, Norway

[73] Assignee: SINTEF (Selskapet for industriell og teknisk forskning ved NTH), Trondheim, Norway

[21] Appl. No.: 853,841

[22] Filed: Nov. 22, 1977

[30] Foreign Application Priority Data

Nov. 22, 1976 [NO] Norway .................................. 763984

[51] Int. Cl.$^2$ ............................................. C08L 33/00
[52] U.S. Cl. ............................................. 260/29.6 RB
[58] Field of Search ................................. 260/29.6 RB

[56] References Cited

U.S. PATENT DOCUMENTS

| | | | |
|---|---|---|---|
| 3,383,346 | 5/1968 | Smith | 260/29.6 RB |
| 3,424,706 | 1/1969 | Smith et al. | 260/29.6 RB |
| 3,969,297 | 7/1976 | Teer et al. | 260/29.6 RB |
| 3,974,119 | 8/1976 | Teer et al. | 260/29.6 RB |
| 4,113,687 | 9/1978 | Ugelstad | 260/29.6 R |

*Primary Examiner*—Maurice J. Welsh

[57] ABSTRACT

Process for producing finely divided aqueous emulsions from materials of limited water solubility. These materials are diffused into pre-formed particles dispersed in water which are formed from vinyl compounds by emulsion polymerization under conditions which cause the pre-formed seed latex to include in the particles 10–100 percent oligomers having a molecular weght of 200–10,000. These seed particles take up 20–500 times their own volume of the material of limited water solubility.

5 Claims, No Drawings

PROCESS FOR PRODUCING FINELY DIVIDED AQUEOUS EMULSIONS FROM MATERIALS OF LIMITED WATER SOLUBILITY

BACKGROUND OF INVENTION

1. Field of Invention

This invention relates to a process for producing finely divided aqueous emulsions from materials of limited water solubility. The term "limited water solubility" means a solubility of $> \sim 10^{-5}$ g/dm$^3$H$_2$O i.e. greater than about $10-5$ grams per cubic decimeter of water.

2. Description of Prior Art

Conventional methods for making fine dispersions in water are contingent upon the use of relatively large quantities of emulsifier and/or very effective homogenisation equipment. The instability of an aqueous emulsion is due to two mechanisms: The drops which come in the neighbourhood of one another will be able to flocculate, that is to say pass over into greater accumulation, something which, if the viscosity is low enough, will be followed by a coalescence, that is an amalgamation. This type of instability will be of particular significance for relatively large drops. With smaller drops another type of instability will be dominant, namely instability made possible by virtue of diffusion. This is due to the solubility in water of a material present in a small drop being greater than for the same material in a larger drop. This effect will exhibit itself the more the smaller the drops are. That is to say that the material which is dispersed will diffuse from small drops over into the large until the small drops have disappeared. This assumes that the dispersed material has a certain solubility so that it will diffuse through the water phase from small drops to larger drops. However, this will be effected rapidly even with materials which have relatively low solubility. With a material with a solubility of about $10^{-2}$ g/dm$^3$H$_2$O, drops of a size of less than 100 nm (nanometers or millimicrons) will certainly not be able to be produced by homogenisation because they will disappear very quickly by diffusion. It is known that finely divided emulsions can be produced without homogenisation, so-called microemulsions, which are stable, but this demands very large emulsifier concentrations, 20-30% based on the dispersed material against 0.1-2% which is the case in the present invention.

In Norwegian Patent Application No. 76.0554, which discloses a process for the production of emulsions of monomeric vinyl compounds, it is shown that a small portion of a highly water-insoluble material can be homogenised so that finely dispersed drops thereof result and that afterwards the monomer of limited water solubility can be stirred in with weak agitation. The monomer of limited water solubility then diffuses into the small amount but higher number of drops of the water-insoluble material with the result that there is formed a stable, finely dispersed emulsion of the monomer of limited water solubility. Degradation by diffusion is, in this case, prevented by the presence of the water-insoluble material which on diffusion will create an osmotic counter-pressure. This process of making stable emulsions of monomers of limited water solubility is advantageous since it reduces the need for homogenisation because only a small portion of a water-insoluble material is homogenised. However, the process requires homogenisation of the small amount of insoluble material. In order to obtain sufficient fine division, a very intense homogenisation is required and it will, at any rate, be difficult to arrive at below 200 nm. in diameter for the drops.

Norwegian Patent Application No. 76 0554 thus deals with a process in which a finely divided emulsion of a water-insoluble material has been pre-prepared and this is utilised to make a dispersion of a far greater quantity of a material of limited water solubility due to the latter material being diffused into the pre-formed drops of the water-insoluble material.

Particles having a very low and controlled size are produced by the well-known method of emulsion polymerisation whereby a vinyl compound is polymerised in the presence of an emulsifier in water. By this process, readily formed particles having a controllable size of 10-500 nm. are obtained. These particles are composed of polymers and will only be able to take up 0.5-5 times their own weight of the material of limited water solubility.

SUMMARY OF INVENTION

The object of the present invention is to provide an improved process for producing finely divided, aqueous emulsions of a material of limited water solubility as defined above. This can be achieved according to the invention by allowing the material of limited water solubility to be absorbed by diffusion into the pre-formed finely dispersed particles formed by emulsion polymerisation of vinyl compounds under conditions which result in a molecular weight of the polymer of between 200 and 10,000.

DESCRIPTION OF CONVENIENT EMBODIMENTS

By the aforesaid process, seed particles can be formed which have a far higher ability to swell with material of limited water solubility. Seed particles are formed by conventional emulsion polymerisation but provision is made for a drastic reduction in molecular weight of at least a portion of the material in the seed particle so that the particles include a substantial proportion of oligomers. This reduction of the molecular weight can be done, for example, by adding a chain transferer or chain stopper during the formation of the seed latex. This involves a drastic increase in the ability of the seed particles to take up the material of limited water solubility. This concerns all materials which can diffuse through the water phase in a reasonable time which requires a solubility of $> \sim 10^{-5}$ g/dm$^3$H$_2$O.

In order to form a seed for use in this invention any vinyl compound can be employed which can be utilised in making a latex. Examples are styrene, vinyl acetate, acrylates vinyl chloride and ethylene. The process thus consists in making a seed latex in the usual way by emulsion polymerisation, the difference being that provision is made, for example, by chain transferers, that the latex particles have a molecular weight of less than 10,000, preferably less than 5000. After the formation of this seed latex, additional water and all necessary emulsifiers are added in order to give sufficient stability to the finished emulsion. After this, the material of limited water solubility is added in an amount relative to the seed particles of 20-500 times by volume, depending upon how large one wishes the particles to be in the final emulsion. There can also be employed a mixture of seed latices having seed particles of different size and, in this way, there is obtained the size distribution of the swollen particles which one requires.

A particular application of this process is realised when the material of limited water solubility is monomeric. Then a very stable emulsion of monomer is formed. By subsequent polymerisation, a latex is then obtained having a particle size which is determined by the size of drop in the monomer emulsion which, in turn, is determined by the particle size of the preformed seed of oligomer.

In normal emulsion polymerisation, monomer and emulsifier and a generally water-soluble initiator are mixed. In this process, particle formation is effected in the aqueous phase. Radicals formed from the initiator react with the monomer dissolved in water. The formed oligomer radicals invade micelles in the water phase and add monomer and partly polymer there so that the particle formation is effected in the micelles or the oligomers precipitate out at a certain chain length and form primary particles which grow further to polymer particles. Monomer diffuses from large monomer drops through the aqueous phase to the particles where polymerisation is effected.

In the novel process, there is obtained a very finely divided, stable emulsion of monomer. There is attained such a large surface of monomer drops that all, or the bulk, of the emulsifier is adsorbed on these. The large surface causes, in this instance, the radicals to be captured by the monomer drops so that initiation and polymerisation is effected there. The fact that all, or the bulk, of the emulsifier is adsorbed on the drops will also lead to a reduction of the tendency for particle formation in the aqueous phase because there is little emulsifier to stabilise the primary particles there.

In the aforesaid Norwegian Patent Application No. 76 0554, it is disclosed that after diffusion of monomer into the pre-formed emulsion of the water-insoluble material one polymerised and that by the polymerisation one got initiation in the monomer drops.

The present invention is not distinguished from that which is described in the aforesaid Norwegian application as regards the polymerisation. While there is formed in Norwegian Patent Application No. 76 0554 a pre-emulsion of a water-insoluble material by homogenisation with the formation of drops in which the monomer diffuses in, so are these drops in the present invention, however, replaced by very small particles formed by conventional emulsion polymerisation with the difference from normal emulsion polymerisation being that one gets oligomers having a molecular weight of 200–10,000 instead of polymer molecules, on forming the seed latex by the addition of chain transferers or chain stoppers.

The present invention represents in the case the material or substance of limited water solubility is monomeric which, after diffusing in, polymerises to polymer, a type of seed technique which is often described in the literature in forming latex. By conventional seed technique, there is in the usual method of emuslion polymerisation formed a latex. A portion of this is employed as seed. Monomer, water, emulsifier and initiator are added to this seed and the polymerisation continued. There is then formed a latex with larger particles than in the original seed latex. Also provision is made here for the polymerisation to occur within the seed particles so that the new formation of particles in the aqueous phase is avoided. The weakness of the conventional seed method is that the seed particles, which consist of polymer molecules as described above, can only take up 0.5–5 times their own volume. If one, for example, forms 500 g. of latex particles from 10 g. of seed particles, this must be done, therefore, in several steps with gradual addition of emulsifier. The 10 g. of seed particles will only receive up to 50 g. of monomer. This gives only a small increase in surface and since one does not wish for too much emulsifier in the aqueous phase, the quantity of emulsifier must be limited to an amount which is adsorbed on the surface of the swollen seed particles. After the polymerisation, there is again added more monomer and emulsifier and the process is again repeated.

It will be apparent that this will require several steps before 500 g. of latex particles are obtained. The process can be made continuous in the way that aqueous emulsifier solution is added to the seed and, if desired, also the monomer, continuously so that one endeavours to ensure that the quantity of emulsifier does not exceed that which can be adsorbed on the steadily growing particles but is not less than the amount which is necessary to guarantee the stability of the latex at a given time. The process is, however, difficult to control. Adsorption of the emulsifier on the particles is not spontaneous but one will readily get such high concentrations of emulsifier in the aqueous phase locally and temporarily, that there is obtained an undesired new formation of particles there. Owing to the fact that there is employed.

In the present invention, a seed in which the particles are wholly or partially composed of oligomers, that is to say molecules having a far lower chain length than conventional polymer molecules, all monomer and emulsifier can be added from the start. These seed particles with oligomer demonstrate namely, as described above, their ability to receive very large quantities of monomer, probably up to 300–400 times their own volume. In practical tests, a take up of about 100 times has previously been achieved but this can be increased further by increasing the size of the seed particles, reducing the molecular weight of the oligomer and increasing the quantity of the emulsifier. This swelling up on absorption of the large amount of monomer leads to a very large increase in surface. This means that even if all the emulsifier is added from the start, this will be completely adsorbed on the surface of the swollen seed particles and that there is little or no emulsifier in the aqueous phase which can lead to the new formation of particles there.

In the process according to Norwegian Patent Application No. 76 0554, there is employed, instead of seed of oligomer, a fine dispersion which is formed by homogenisation, in the presence of water and emulsifier, of a water-insoluble substance having a relatively low molecular weight. The advantage of the present invention relative to that which is described in the Norwegian application, is that no homogenisation step is utilised and hence no need for homogenisation equipment arises. Furthermore, it is easier to form seed latices with particles of the desired size, one being able with the present process to obtain far smaller particles than can be done for the drops by homogenisation. This makes for a far wider area of choice of particle size in the finished latex. It must be stressed that in the present invention there can be utilised a mixture of seed of oligomer having different sizes. On swelling of the monomer and subsequent polymerisation, a latex can then be formed which has a particle size and particle size distribution as required.

The seed latex of oligomers employed can, but need not, be formed of the same monomer as the monomer one wishes to polymerise in the second step. It is sufficient that the oligomer formed in preparing the seed is in a condition to swell with the monomer employed in the second step. The process described in the present invention can be emplyed for the same monomer system as described in Norwegian Patent Application No. 76 0554.

In the polymerisation of monomer after it is received in the seed particles, there can be employed potassium persulphate ($K_2S_2O_8$) or hydrogen peroxide and the usual polymer latex of this monomer is formed. It is also possible to use an oil-soluble initiator such as AIBN. In this latter instance, this can be added in the form of a solution or dispersion and in this case the AIBN will diffuse into the seed particles. It is also possible to use oil-soluble initiator during the preparation of the seed latex. In this instance, the seed will contain initiator and addition of the latter after swelling with monomer can be dispensed with or reduced. As emulsifier, there can be employed either the usual anionic or non-ionic emulsifiers. When one uses hydrogen peroxide or AIBN as initiator, there can also be employed a cationic emulsifier.

The invention will now be illustrated with reference to the following Examples:

EXAMPLE 1

10 g. of seed latex was prepared by emulsion polymerisation of styrene. The preparation occurred at 50° C. with 10 g. of styrene, 100 ml. of water, 0.05 g. of sodium lauryl sulphate, 0.50 of 1-butanethiol and 0.30 potassium persulphate. Addition of the butanethiol occurred after 10% of the styrene had polymerised. There was formed a seed latex having particles which had a diameter of about 150 nm. The oligomers which were formed had a molecular weight of about 1000. To this latex there was added 400 ml. of water including 2 g of sodium lauryl sulphate. After stirring at 50° C., there was added 300 ml. of chlorobenzene. In the course of about 30 minutes, all of the chlorobenzene was absorbed in the pre-formed seed particles which had a diameter of 300–500 nm. This emulsion was very stable and exhibited no change after storage for one month at 25° C.

EXAMPLE 2

The seed latex was prepared as described in Example 1 but with the quantity of emulsifier used during the formation of the seed latex reduced to 0.02 g. There was formed a seed latex which with a particle size of from 200–250 nm. container oligomer having a molecular weight of about 1000.

To this latex, there was added 900 ml. of water including 3.5 g. of sodium lauryl sulphate, 800 ml. of chlorobenzene was added during stirring at 50° C. and diffused into the pre-formed seed particles in the course of 15 min. There was formed a very stable emulsion of chlorobenzene having 40% by volume of the organic phase and with a drop size of 500–1000 nm.

EXAMPLE 3

The seed latex was prepared as described in Example 1 but with 0.5 g. of sodium octyl sulphate replacing the sodium lauryl sulphate as emulsifier. Furthermore, butanethiol was, in this case, already added from the start. There was formed a seed latex having a particle size of 300 nm. This seed latex could be employed for preparing a dispersion of substances of limited water solubility as described in Examples 1 and 2.

EXAMPLE 4

The seed latex was prepared as described in Example 1 but with sodium octyl sulphate (0.05 g) being used as emulsifier and totally 0.7 g. of 1-propanethiol being added in three portions after 5, 30 and 60% conversion. A seed latex was formed having a particle size of about 400 nm. GPC investigations showed that the oligomer had a relatively narrow molecular weight distribution of 300–500.

This seed latex could be employed for producing dispersions of limited water solubility substances as described in Examples 1 and 2.

EXAMPLE 5

The seed latex was prepared as described in Example 1 but with the difference that no emulsifier was used and that 0.36 g. of 1-propanethiol was employed as chain transferer. A seed latex was formed having a particle size of about 500 nm.

This seed latex could be utilised in the preparation of dispersions of substances of limited water solubility as described in Examples 1 and 2.

EXAMPLE 6

The seed latex was prepared as described in Example 1. To this was added 900 ml. of water and 3.5 g. of sodium lauryl sulphate. Vinyl chloride was added in an amount of 700 g. at 50° C. during stirring. After 30 min. there was added 2.0 g of potassium persulphate and the polymerisation was effected at 50° C. in ten hours. The polyvinyl chloride latex has about 40% dry solids content where all the particles were in the region of 400–700 nm.

EXAMPLE 7

The seed latex was prepared as described in Example 5. To this was added 900 ml. water, 2.5 g of sodium lauryl sulphate and 500 ml. of styrene at 20° C. After stirring for one hour, 5 g. of AIBN dissolved in 25 ml. of 1,2 dichloroethane was added. After 30 mins. stirring, the temperature was raised to 50° C. and polymerisation carried out to full conversion. The finished latex of polystyrene had a dry solids content of about 30% and a particle size of 1500–2000 nm.

I claim:
1. Process for producing finely divided, aqueous emulsions of a material of limited water solubility which comprises absorbing said material by diffusion into pre-formed particles dispersed in water as a seed latex formed by the emulsion polymerisation of a vinyl compound under conditions causing said latex to include in the particles 10–100% oligomers having a molecular weight of 200–10000, said particles having the ability to take up 20–500 times their own volume of said material.

2. Process of claim 1, wherein said vinyl compound is selected from the group consisting of styrene, vinyl acetate, acrylates, vinyl chloride and ethylene.

3. Process of claim 1, which comprises regulating the molecular weight of the oligomers formed by adding a chain transferer.

4. Process of claim 1, which comprises using as the material of limited water solubility a monomer which is added in a quantity 20–500 times by volume that of the quantity of seed latex particles.

5. Process of claim 4, which comprises carrying out polymerisation by means of an initiator after the monomer has been absorbed in the particles of seed latex.

* * * * *